(12) United States Patent
Lenzing et al.

(10) Patent No.: US 7,260,986 B2
(45) Date of Patent: Aug. 28, 2007

(54) AIRFLOW METER WITH DEVICE FOR THE SEPARATION OF FOREIGN PARTICLES

(75) Inventors: Thomas Lenzing, Benningen (DE); Klaus Reymann, Gerlingen (DE); Uwe Konzelmann, Asperg (DE); Torsten Schulz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 10/528,898

(22) PCT Filed: May 23, 2003

(86) PCT No.: PCT/DE03/01673

§ 371 (c)(1),
(2), (4) Date: Sep. 2, 2005

(87) PCT Pub. No.: WO2004/031703

PCT Pub. Date: Apr. 15, 2004

(65) Prior Publication Data

US 2006/0137438 A1    Jun. 29, 2006

(30) Foreign Application Priority Data

Oct. 2, 2002 (DE) .............................. 102 46 069

(51) Int. Cl.
   *G01F 1/68* (2006.01)
(52) U.S. Cl. .................. 73/204.21; 73/202.5
(58) Field of Classification Search ............ None
   See application file for complete search history.

(56) References Cited

U.S. PATENT DOCUMENTS 6,332,356 B1    12/2001    Hecht et al.

| | | | |
|---|---|---|---|
| 6,526,822 B1 * | 3/2003 | Maeda et al. | 73/204.21 |
| 6,571,621 B2 * | 6/2003 | Watanabe et al. | 73/202.5 |

FOREIGN PATENT DOCUMENTS

| | | |
|---|---|---|
| DE | 44 04 505 | 8/1995 |
| DE | 196 23 334 | 12/1997 |
| WO | WO99 53274 | 10/1999 |
| WO | WO 02 18886 | 3/2002 |

OTHER PUBLICATIONS

G. Gauthier et al., "Centrifugal instabilities in a curved rectangular duct of small aspect ratio," Physics of Fluids, Bd. 13, Nr. 10, Oct. 31, 2001 (pp. 2831-2834).

* cited by examiner

*Primary Examiner*—Harshad Patel
(74) *Attorney, Agent, or Firm*—Kenyon & Kenyon LLP

(57) ABSTRACT

A device is provided for determining at least one parameter of a medium flowing in a line in a main flow direction, e.g., a parameter of the intake air mass of an internal combustion engine. The device includes a part, which is inserted into the line at a predetermined alignment with respect to the main flow direction in such a way that a partial flow of the medium flowing in the line in the main flow direction flows through at least one measuring channel provided in the part in a first direction from an intake of the measuring channel to an outlet of the measuring channel. The device further includes a measuring element situated in the measuring channel for determining the at least one parameter. Between its intake and its outlet, the measuring channel features at least one channel segment in which a mechanism is located that causes flow vortices in this channel segment, whereby liquid droplets and solid particles are advantageously deposited on the inner wall of the channel before they can reach the measuring element.

13 Claims, 3 Drawing Sheets

AIRFLOW METER WITH DEVICE FOR THE SEPARATION OF FOREIGN PARTICLES

FIELD OF THE INVENTION

The present invention relates to a device for determining at least one parameter of a medium flowing in a line.

BACKGROUND INFORMATION

Published German patent document DE 196 23 334 describes a device for determining the mass of a medium flowing in a line, having a part which is inserted into the line and in which a measuring channel having a measuring element is situated. Devices of this kind are used, for example, as air-mass meters in the air-intake tract of an internal combustion engine. Spray water and dust, which are transported by the medium, are able to enter the air-intake tract. Moreover, when shutting down the internal combustion engine, oil vapor may enter the air-intake tract through the crankshaft ventilation inlet. In the known device, the fluid or solid particles transported with the medium can penetrate into the measuring channel and soil the measuring element. The resulting change of the sensor characteristic leads to disadvantageous deviations of the measuring results from the actually obtaining values.

SUMMARY

The device according to the present invention for determining at least one parameter of a medium flowing in a line has the advantage that the danger of a contamination of the measuring element by liquid droplets or solid particles is markedly reduced and a characteristic drift is reliably avoided. Means provided in a channel segment of the measuring channel cause flow vortices in this channel segment. In the flow vortices, the liquid droplets and solid particles do not move with the same alignment in the longitudinal direction of the channel, but rather approximately in a screw- or spiral-like manner. Before they can reach the measuring element, the liquid and solid particles, having entered the measuring channel, are advantageously deposited in the measuring channel as a consequence of the different densities of liquid and solid particles on the one hand and of the medium on the other hand and the resulting different centrifugal forces.

It is known that, in the operation of the internal combustion engine, air flows in a main flow direction in the line of the air-intake tract, a partial flow of this air reaching the measuring channel of the device and streaming through this measuring channel in a predetermined first direction from the intake to the outlet. If there is now a brief return flow of the medium in the line counter to the proper main flow direction, when the internal combustion engine is switched off for example, oil droplets and similar contaminants, which enter the line of the intake tract through the crankcase ventilation inlet of the vehicle and which are transported by the return flow counter to the main flow direction, can enter the measuring channel through the outlet of the measuring channel. Especially advantageous therefore is an exemplary embodiment of the device according to the present invention in which the channel segment, fitted with the means that cause the vortices, is situated, when viewed in the first direction, between the measuring element and the outlet of the measuring channel, as a result of which flow vortices are created in the return flow in this channel segment causing the oil droplets to be deposited before they can reach the measuring element.

The means can be formed in a simple manner by structuring the inner wall of the channel segment, which may feature steps, edges, projections or similar geometries, at which flow vortices form in the medium flowing into the measuring channel. It is especially advantageous, if the inner wall of the channel segment has at least one step and preferably several steps arranged in series. The flow vortices can be additionally amplified, if at least one step is formed on opposite inner walls of the channel segment.

In an exemplary embodiment, the measuring channel has a first segment having an interior cross-section continuously tapering in the first direction. The first segment is mediately or immediately followed by a further segment having an interior cross-section increasing by steps in the first direction. The segment continuously tapering in its interior cross-section in the first direction preferably acts in the first direction as an acceleration slope for the partial flow of the medium flowing through the measuring channel in the forward direction from the intake to the outlet. The second segment acts in the case of a return flow of the medium in the measuring channel, flow vortices advantageously forming in series at several steps and liquid droplets and solid particles depositing on the inner wall of this segment of the measuring channel.

The steps in this channel segment advantageously have an edge running at least partly at an angle and/or at least partly transversely to the direction of flow of the medium in the measuring channel. It can thereby be achieved that the flow of the medium flowing across the edge forms screw-like or spiral-like flow vortices which rotate about imaginary axes running at an angle and/or transversally to the direction of flow.

Due to the fact that the at least one step has an edge running essentially transversally to the direction of flow of the medium in the measuring channel and that the step has a recess opening towards the edge of the step, the edges of the recess running at least partly at an angle or parallel to the direction of flow of the medium in the measuring channel, the formation of screw-like or spiral-like flow vortices can be achieved, which rotate about imaginary axes running approximately along the direction of flow. The latter are especially advantageous for the deposition of oil droplets and contaminants on the inner walls of the channel segment of the measuring channel.

To generate flow vortices that run approximately along the direction of flow, it is also possible to fit the inner wall of the channel segment with structures, the edges of which run approximately along the direction of flow in the measuring channel. These structures can be formed by longitudinal ribs running along the direction of flow in the measuring channel and projecting into the interior, which are preferably distributed in this channel segment over the entire inner circumference of the inner wall.

DETAILED DESCRIPTION

Figure 1:
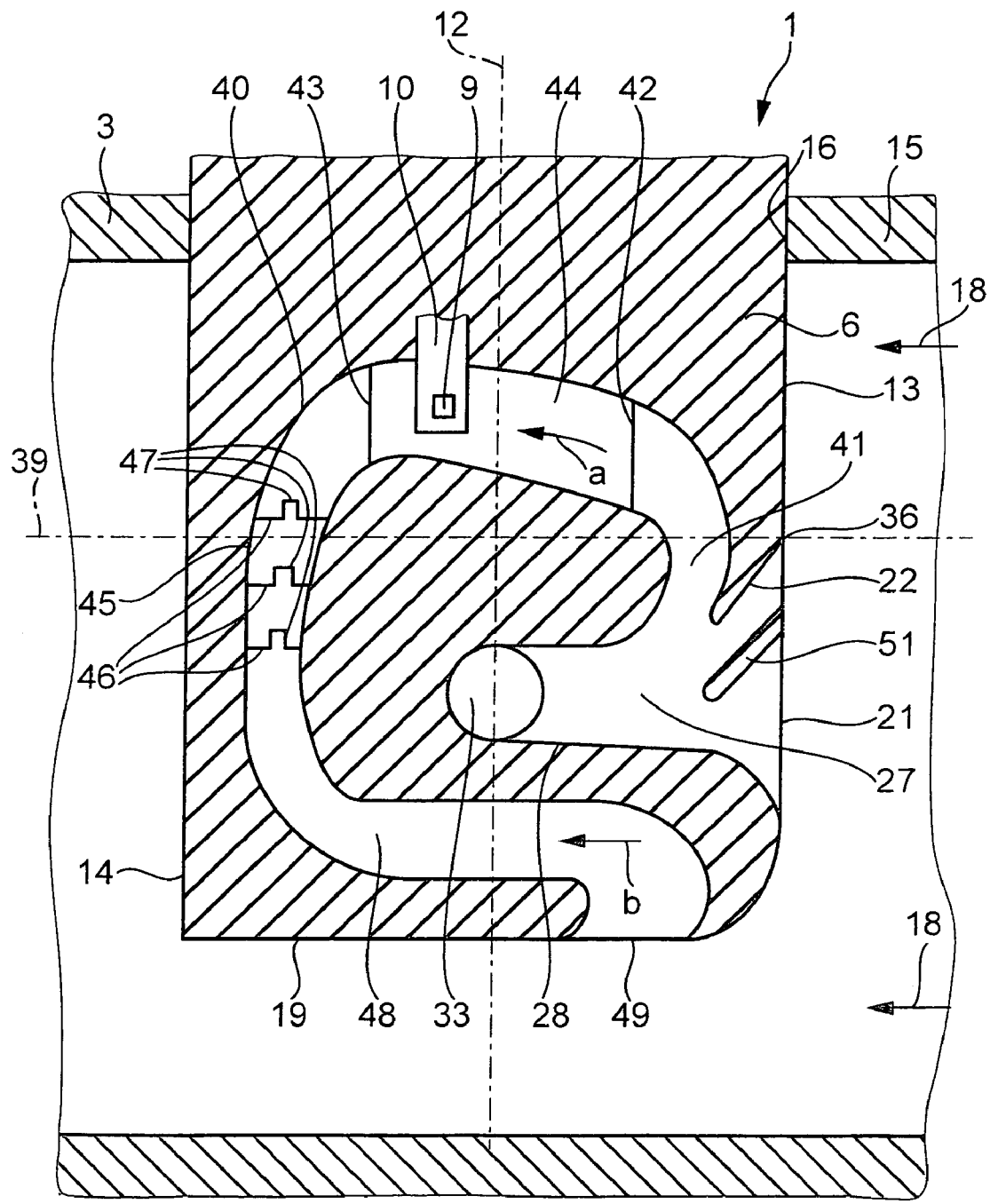
FIG. 1 shows a cross-section of a first exemplary embodiment of the device according to the present invention that is fitted with the measuring channel, which device is inserted in the intake line.

FIG. 1 shows a section of a line 3 in which a medium flows in a main flow direction 18. The line may be, for example, an intake manifold of an internal combustion engine. The medium, for example, is the air flowing in the intake manifold which is fed to the internal combustion engine in the main flow direction 18. A device 1 according to the present invention is situated at line 3 in such a way that a part 6 of the device protrudes into line 3 and is exposed to the medium flowing there at a predetermined alignment. In addition to part 6 inserted into the line, device 1 for determining at least one parameter of the medium also includes a carrier part, not shown in detail, having an electrical connection, an evaluation electronics being accommodated, for example, in the carrier part. Together with part 6, device 1 may be inserted, for example, through an insertion opening 16 of a wall 15 of line 3, wall 15 delimiting a flow cross-section of line 3. The evaluation electronics may be positioned inside and/or outside of the flow cross-section of line 3.

For example, in device 1, a measuring element 9 is used on a measuring element carrier 10 that is electrically connected to the evaluation electronics. With the aid of measuring element 9, for example, the volumetric flow or the mass flow of the flowing medium is determined as a parameter. Additional parameters which may be measured are, for instance, pressure, temperature, concentration of a medium component or flow velocity, which are ascertainable using suitable sensor elements.

Device 1 has, for instance, a longitudinal axis 12 in the axial direction, which, for example, proceeds into line 3 in the insertion direction of device 1, and which may also be, for example, the center axis. The direction of the flowing medium, referred to in the following discussion as the main flow direction 18, is indicated by corresponding arrows 18 in FIG. 1, and runs there from right to left. When installing part 6 into line 3, it is ensured that part 6 has a predetermined orientation with respect to main flow direction 18 of the medium.

Part 6 has a housing having, for example, a rectangular-shaped structure, including a front wall 13 facing towards, and a back wall 14 facing away from, main flow direction 18 of the medium in the installation position, a first side wall and a second side wall and a third wall 19 running, for example, parallel to the main flow direction. In addition, part 6 has a channel structure located therein, having an input region 27 and a measuring channel 40 branching off from input region 27. The positioning of device 1 relative to line 3 ensures that the medium flowing in main flow direction 18 impinges upon part 6 in a predetermined direction and that a partial flow of the medium in this direction reaches input region 27 through an opening 21 at front side 13. Opening 21 may be aligned perpendicular to main flow direction 18, for example, but another orientation of opening 21 to main flow direction 18 is conceivable as well. Starting from input region 27 and proceeding through an intake 41, the medium partially reaches measuring channel 40 branching off from the intake area and fitted with measuring element 9. It partially continues to flow into a separation zone 28, located downstream of the intake of the measuring channel, which is connected to line 3 through at least one separation opening 33 situated in the first side wall and/or in the second side wall and/or in wall 19. In the flowing medium, for example, liquid and/or solid particles such as oil or water particles are present, which could soil or damage measuring element 9. Through separation opening 33, the liquid and solid particles are able to flow back into line 3. In the exemplary embodiment shown in FIG. 1, main flow direction 18 runs in a plane in which separation opening 33 is situated as well. However, the plane in which separation opening 33 is located may also be situated at an angle differing from zero degrees with respect to main flow direction 18.

In axial direction 12, opening 21 at front side 13 of part 6 has an upper edge 36, which is closest to measuring element 9 in axial direction 12. An imaginary upper plane 39 runs through upper edge 36 as well as perpendicular to the plane of the drawing in FIG. 1 and parallel to the main flow direction 18. Separation opening 33 is situated in axial direction 12 below this upper plane 39. In the area of opening 21, input region 27 is provided with slanted or curved surfaces 22 and with a separating wall 51, which is constructed in such a way that the medium flowing into the input region is steered away from the upper plane 39.

Since the liquid and/or solid particles are larger and have a greater density than the gaseous flowing medium, they move in axial direction 12 away from upper plane 39. Since separation opening 33 is situated below upper plane 39, the liquid and solid particles collect in separation zone 28 and are sucked out into line 3 by the air flowing past separation opening 33.

Starting from input region 27, a first segment of measuring channel 40 extends from intake 41 at first approximately to insertion opening 16. Having entered measuring channel 40 through intake 41 in a first direction a, the partial flow flows to measuring element 9. This first segment is followed by a further segment 44, in which the partial flow is deflected and flows past measuring element 9. When viewed in direction a of the flow, the cross-section of further segment 44 tapers approximately from line 42 shown in FIG. 1 upstream of the measuring element to line 43 downstream of measuring element 9. This is achieved by two mutually facing acceleration slopes, the viewer in the representation of FIG. 1 looking perpendicularly onto the first slope. Due to the tapering of the cross-section or due to the acceleration slopes in the form of an all-round or partial narrowing of the side surfaces of measuring channel 40, the medium is transported rapidly in the first direction a through the measuring channel and following air is thereby siphoned off from the input region 27. From segment 44, the medium continues to flow and is deflected into a channel segment 45 of the measuring channel, extending away from insertion opening 16 approximately in axial direction 12. From this segment, it is deflected into an additional segment 48, which runs, for example, counter to main flow direction 18, and reaches line 3 via an outlet 49 of measuring channel 40, which is situated, for example, perpendicularly to main flow direction 18 or at an angle differing from zero degrees with respect to main flow direction 18. Here, measuring channel 40 is thus designed approximately in a C shape, for example.

If the medium in line 3 flows counter to the proper main flow direction 18, when the internal combustion engine is switched off for example, oil droplets and similar contaminants, which enter the line of the intake tract through the crankcase ventilation inlet of the vehicle and which are transported counter to main flow direction 18, can enter measuring channel 40 through outlet 49 of measuring channel 40. This medium flow flows in a second direction b (return flow) counter to the first direction a into the measuring channel as shown in FIG. 1. As can also be seen in FIG. 1, means 46 are situated in channel segment 45 in direction b of the return flow behind outlet 49 and in front of measuring element 9, which, in the case of a return flow, cause flow vortices in this channel segment and which lead to the deposition of the oil droplets before they can reach the measuring element. These means can in principle be formed in various ways. It is conceivable, for example, to install separating walls, crosspieces or similar means that cause the formation of vortices. In the exemplary embodiment shown here, the means are formed by structuring the inner wall of the channel segment. The interior cross-section of channel segment 45 increases by steps in the first direction a, at least one step being provided and the steps 46 having an edge 57 running at least partly at an angle and/or at least partly transversely to the direction of flow b of the medium in the measuring channel 40. In FIG. 1, the steps are formed at the inner wall of channel segment 45 visible in FIG. 1 and on another inner wall of channel segment 45 which lies across from this inner wall and which is not visible in the cross-sectional view.

Figure 2:
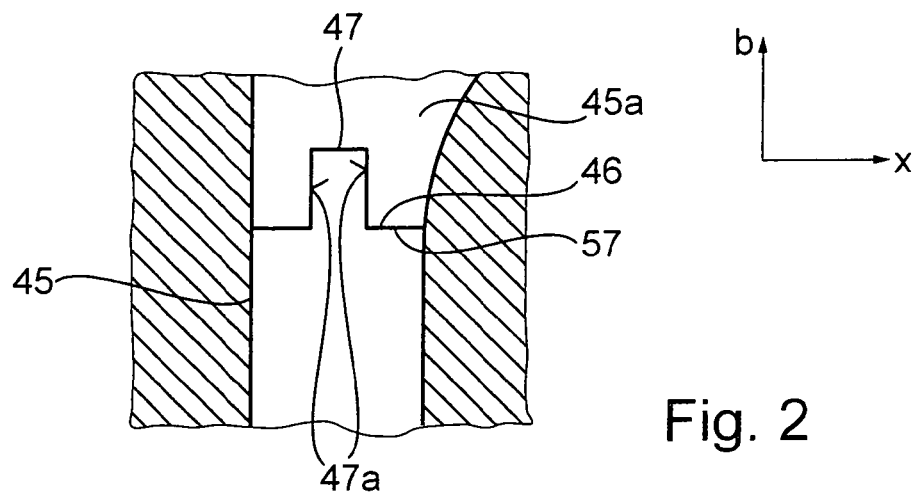
FIGS. 2 through 4 show three different exemplary embodiments for the structuring of the inner wall of the channel segment generating the flow vortices.

FIG. 2 shows an enlarged detailed view of the channel segment 45. The at least one step 46 has an edge 57 running essentially transversely to the direction of flow of the medium in measuring channel 40 in direction x. As can also be seen, step 46 additionally has a recess 47 opening towards edge 57, the edges 47a of recess 47 running at least partly at an angle or parallel to the direction of flow of the medium (direction b) in measuring channel 40. In the case of a return flow in direction b, the medium flow flows towards step 46. Screw-like or spiral-like flow vortices, their axes extending in the X direction, are thereby created at edge 57 running transversely to direction b. Additionally, screw-like or spiral-like flow vortices with axes running in direction b are created at edges 47a. The flow vortices forming at the steps are macro-vortices having an axial and radial extension in the millimeter range. Due to the flow vortices, fluid droplets and dirt particles are deposited on the inner wall of channel segment 45 before they can reach measuring element 9. For clarification, it should be mentioned that in the context of the present disclosure, "flow direction a" or "flow direction b" mean the direction of the flow from the intake to the outlet of the measuring channel, or, in the opposite direction, from the outlet to the intake, and not the direction of the circulating flow in the generated vortices.

Figure 3:
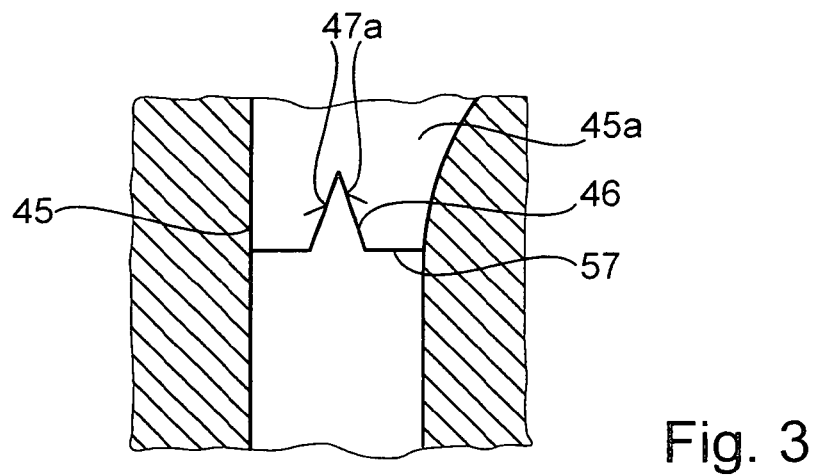

A second exemplary embodiment is shown in FIG. 3. Here, edges 47a of recess 47 run at an angle with respect to flow direction b of the return flow, so that flow vortices having axes that run at an angle with respect to flow direction b are also formed at recess 47.

Figure 4:
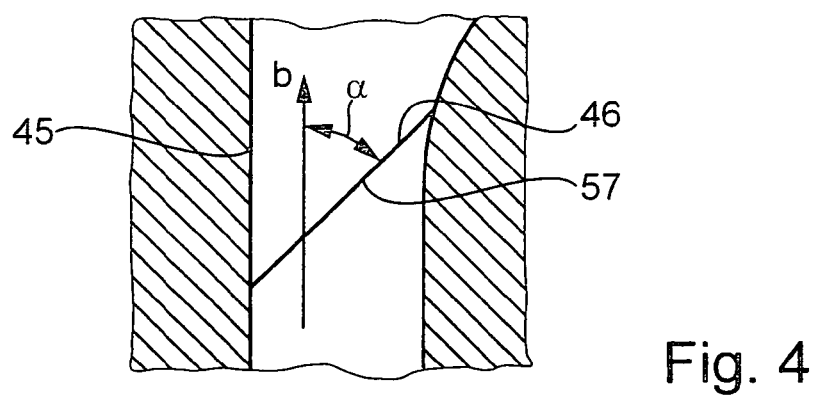

An additional exemplary embodiment is shown in FIG. 4. Here, step 46 is formed having an edge 57 running at an angle with respect to flow direction b of the return flow, resulting in the formation of flow vortices having an axis running at an angle a with respect to flow direction b.

In the exemplary embodiments of FIG. 1 through FIG. 4, steps 46 are situated, when viewed in the flow direction "a", downstream of the measuring element so as to generate flow vortices in case of a return flow of the medium in flow direction b. It is also possible, however, to provide steps or other structures between intake 41 and the measuring element so as to generate flow vortices in a medium flow in the flow direction a leading from the intake to the outlet of the measuring channel as well, so that humidity and solid particles that have entered the measuring channel through the intake are deposited on the inner wall on the upstream side of the measuring element.

Figure 5:
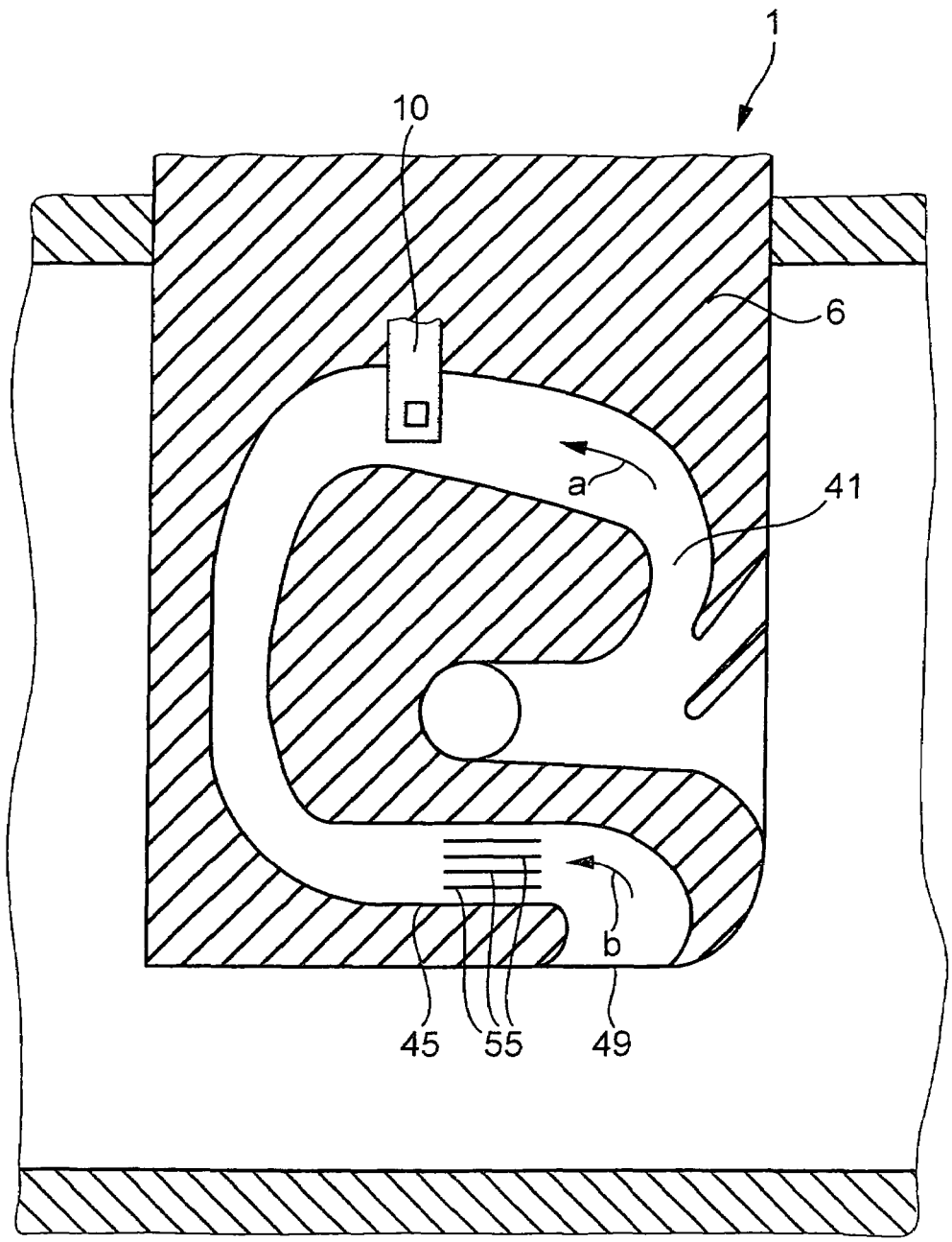
FIG. 5 shows a cross-section of a further exemplary embodiment of the device according to the present invention that is fitted with the measuring channel, which device is inserted in the intake line.

An additional exemplary embodiment is shown in FIG. 5. In this exemplary embodiment, channel segment 45 fitted with the structures is situated more closely to outlet 49. The inner wall 45a of channel segment 45 is provided with structures having edges that run approximately along flow direction b in measuring channel 40. In a particularly advantageous manner, the structures may be formed by longitudinal ribs 55 running along the direction of flow in the measuring channel and projecting into the interior, which are preferably distributed in this channel segment over the entire inner circumference of the inner wall. In case of a return flow, flow vortices are formed along flow direction b in channel segment 45 due to ribs 55. As a result of the different densities of oil droplets and air and of the resulting different magnitudes of the centrifugal forces, the oil present in the air is deposited on the surface of the inner wall of the measuring channel.

What is claimed is:

1. A device for determining at least one parameter of an intake air mass for an internal combustion engine, the intake air mass flowing in a line in a main flow direction, comprising:
   a housing having a measuring channel, wherein the housing is configured to be inserted into the line at a predetermined alignment with respect to the main flow direction, whereby at least a portion of the intake air mass flowing in the line in the main flow direction flows through the at least one measuring channel in a first direction from an intake of the measuring channel to an outlet of the measuring channel;
   a measuring element situated in the measuring channel for determining the at least one parameter; and
   a mechanism situated in at least one channel segment located between the intake and the outlet of the measuring channel, wherein the mechanism causes flow vortices in the at least one channel segment;
   wherein the at least one channel segment is situated, when viewed in the first direction, between the measuring element and the outlet of the measuring channel, and wherein the mechanism causes flow vortices in the at least one channel segment at least in the case of a return flow of the intake air mass flowing from the outlet to the intake of the measuring channel in a second direction counter to the first direction.

2. The device as recited in claim 1, wherein the mechanism is formed by structuring an inner wall of the at least one channel segment.

3. The device as recited in claim 2, wherein the inner wall includes one of steps, edges, and projections suitable for generating flow vortices.

4. The device as recited in claim 3, wherein the inner wall of the at least one channel segment includes at least one step.

5. The device as recited in claim 4, wherein at least two steps are formed on opposing sides of the inner wall of the at least one channel segment.

6. The device as recited as recited in claim 4, wherein the measuring channel includes a futher segment having an interior cross section continuously tapering in the first direction, and wherein the further segment is followed, in the first direction, by the at least one channel segment, and wherein the at least one channel segment has an interior cross section increasing by a plurality of steps in the first direction.

7. The device as recited in claims 6, wherein each step includes an edge extending at least one of: a) at least partly at an angle to a direction of flow of air mass in the measuring channel; and b) at least partly transversely to a direction of flow of air mass in the measuring channel.

8. The device as recited in claim 6, wherein each step includes an edge extending substantially transverse to a direction of flow of air mass in the measuring channel, and wherein the at least one step includes a recess opening towards the edge of the step, and wherein the recess includes edges extending one of: a) at least partly at an angle to a direction of flow of air mass in the measuring channel; and b) parallel to a direction of flow of air mass in the measuring channel.

9. The device as recited in claim 4, wherein the at least one step includes an edge extending at least one of: a) at least partly at an angle to a direction of flow of air mass in the measuring channel; and b) at least partly transversely to a direction of flow of air mass in the measuring channel.

10. The device as recited in claim 4, wherein the at least one step includes an edge extending substantially transverse to a direction of flow of air mass in the measuring channel, and wherein the at least one step includes a recess opening towards the edge of the step, and wherein the recess includes edges extending one of: a) at least partly at an angle to a direction of flow of air mass in the measuring channel; and b) parallel to a direction of flow of air mass in the measuring channel.

11. The device as recited in claim 2, wherein the mechanism is provided on the inner wall of the at least one channel segment, the mechanism having edges that extend approximately parallel to a direction of flow of air mass in the measuring channel.

12. The device as recited in claim 11, wherein the mechanism includes inwardly projecting longitudinal ribs extending substantially parallel to the direction of flow of the air mass in the measuring channel, and wherein the longitudinal ribs are distributed over the inner circumference of the inner wall in the at least one channel segment.

13. A device for determining at least one parameter of an intake air mass for an internal combustion engine, the intake air mass flowing in a line in a main flow direction, comprising:

a housing having a measuring channel, wherein the housing is configured to be inserted into the line at a predetermined alignment with respect to the main flow direction, whereby at least a portion of the intake air mass flowing in the line in the main flow direction flows through the at least one measuring channel in a first direction from an intake of the measuring channel to an outlet of the measuring channel;

a measuring element situated in the measuring channel for determining the at least one parameter; and a mechanism situated in at least one channel segment located between the intake and the outlet of the measuring channel, wherein the mechanism causes flow vortices in the at least one channel segment;

wherein the at least one channel segment is situated, when viewed in the first direction, between the measuring element and the outlet of the measuring channel, and wherein the mechanism causes flow vortices in the at least one channel segment at least in the case of a return flow of the intake air mass flowing from the outlet to the intake of the measuring channel in a second direction counter to the first direction;

wherein the measuring channel includes a segment having an interior cross section continuously tapering in the first direction;

wherein the segment is followed, in the first direction, by the at least one channel segment; and wherein the at least one channel segment has an interior cross section increasing by a plurality of steps in the first direction.

\* \* \* \* \*